(12) United States Patent
Ehlen et al.

(10) Patent No.: US 12,004,505 B2
(45) Date of Patent: Jun. 11, 2024

(54) AGRICULTURAL DISTRIBUTION DEVICE

(71) Applicant: Amazonen-Werke H. Dreyer GmbH & Co. KG, Hasbergen (DE)

(72) Inventors: Volker Ehlen, Hasbergen (DE); Stefan Jan Johannaber, Lienen (DE); Stefan Kiefer, Osnabrück (DE); Christian Holtkötter, Versmold (DE); Timo Klemann, Belm (DE); Florenz Hilbert, Emsdetten (DE)

(73) Assignee: AMAZONEN-WERKE H. DREYER SE & CO. KG (DE)

( * ) Notice: Subject to any disclaimer, the term of this patent is extended or adjusted under 35 U.S.C. 154(b) by 394 days.

(21) Appl. No.: 17/206,658

(22) Filed: Mar. 19, 2021

(65) Prior Publication Data

US 2021/0291216 A1 Sep. 23, 2021

(30) Foreign Application Priority Data

Mar. 20, 2020 (EP) .................................. 20401021

(51) Int. Cl.
*A01C 15/00* (2006.01)
*A01M 9/00* (2006.01)
*B05B 1/20* (2006.01)
*B05B 12/12* (2006.01)

(52) U.S. Cl.
CPC ........... *A01M 9/0092* (2013.01); *A01C 15/00* (2013.01); *B05B 1/20* (2013.01); *B05B 12/122* (2013.01)

(58) Field of Classification Search
CPC ...... B05B 1/20; B05B 12/122; A01M 9/0092; A01M 7/0089; A01M 7/0057; A01M 7/0014; A01M 7/0042; A01C 15/00
See application file for complete search history.

(56) References Cited

U.S. PATENT DOCUMENTS

| | | | | |
|---|---|---|---|---|
| 5,279,068 A | * | 1/1994 | Rees | A01M 7/0057 47/1.7 |
| 2015/0059626 A1 | * | 3/2015 | Conrad | A01M 9/0092 111/120 |
| 2016/0000003 A1 | | 1/2016 | Wendte et al. | |
| 2017/0265379 A1 | | 9/2017 | Moore et al. | |
| 2018/0243771 A1 | * | 8/2018 | Davis | A01B 63/004 |

FOREIGN PATENT DOCUMENTS

DE 36 36 363 A1 4/1988
EP 3 409 090 A1 12/2018

OTHER PUBLICATIONS

European Search Report dated Aug. 20, 2020 in corresponding European Patent Application No. EP 20401021.9.

* cited by examiner

*Primary Examiner* — Christopher R Dandridge
(74) *Attorney, Agent, or Firm* — Mintz Levin Cohn Ferris Glovsky and Popeo, P.C.

(57) ABSTRACT

An agricultural distribution device includes a plurality of spreading elements arranged on a distribution linkage and adapted to spread granular material on an agricultural land, a detection device adapted to detect plant rows on the agricultural land, an adjustment device configured to change an impact area of the granular material dispensed by one or more of the spreading elements on the agricultural land during a spreading process, and a control device which is adapted to control the adjustment device as a function of the plant rows on the agricultural land detected by the detection device during the spreading process.

12 Claims, 3 Drawing Sheets

AGRICULTURAL DISTRIBUTION DEVICE

CROSS REFERENCE TO RELATED APPLICATION

Figure 1:
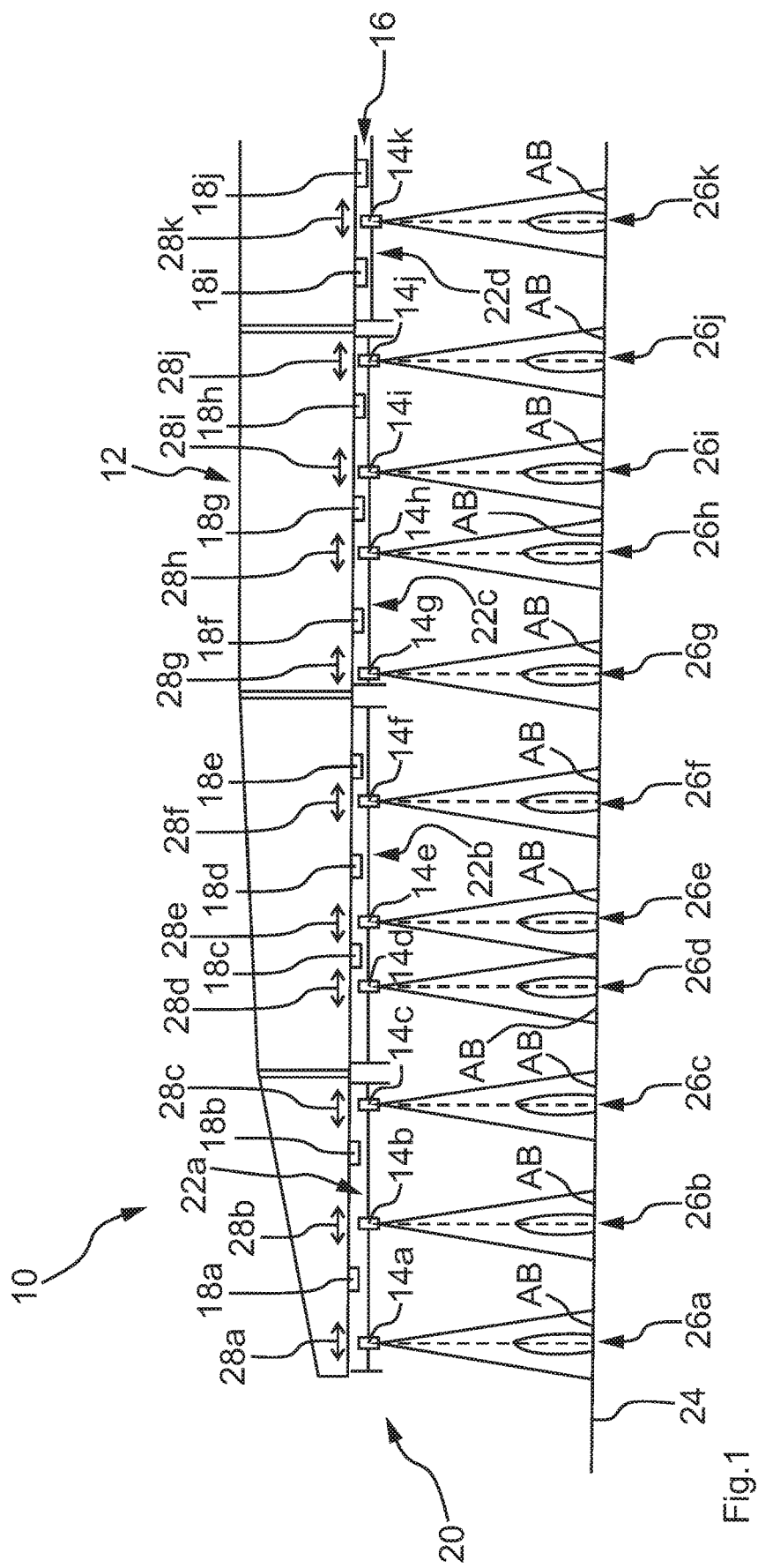

The present application claims under 35 U.S.C. § 119(a) the benefit of European Patent Application No. 20401021.9, filed Mar. 20, 2020, the entire contents of which are incorporated by reference herein.

The invention relates to an agricultural distribution device and to a method of spreading granular material.

When spreading granular material onto an agricultural land, it is advantageous if the granular material is delivered to the immediate vicinity of the respective plants on the agricultural land. Since seeding of a large number of agricultural crops takes place along seed rows, plant rows are formed on the agricultural land during the growth of the crops.

Thus, a particularly effective and efficient spreading of granular material can be achieved by spreading the material in a row-related manner so that the granular material is substantially spread along spreading strips, wherein the spreading strips run along plant rows.

In the state of the art, methods are already known with which plant rows on agricultural land can be detected. A corresponding method is known, for example, from document DE 196 42 439 C1.

However, when spreading granular material, it must be taken into account that the working width of distribution linkages of generic distribution devices, such as pneumatic spreaders, usually exceeds the working width of seed drills many times over and that irregular distances of the individual seed rows from one another occurs during seed spreading due to inaccurate follow-up travel. The resulting plant rows therefore usually run substantially parallel to one another, while the distance of individual plant rows to one another can vary. With the rigid spreading element arrangements known in the prior art, no suitable adaptation to the plant row offset can be implemented. The plant row-related material spreading is therefore comparatively inaccurate so that the effect of the granular material spread is often considerably impaired.

The problem underlying the invention is thus to improve the precision in the row-related spreading of granular material.

The problem is solved by an agricultural distribution device of the kind mentioned introductorily, wherein the agricultural distribution device according to the invention comprises a control device which is adapted to control the adjustment device as a function of the plant rows on the agricultural land detected by the detection device during the spreading process.

The invention makes use of the finding that by controlling the adjustment device as a function of the plant rows detected by the detection device, the impact area of a spreading element or the impact areas of several spreading elements can be adapted to irregularities in the spacing of the plant rows. Thus, a precise row-related spreading of granular material can be effected, even if adjacent plant rows on the agricultural land have partly different distances from each other. A spreading element can be configured as a distribution nozzle, baffle plate, guide device, diverter, centrifugal plate and/or the like. In particular, all spreading elements can be configured in the same way.

The control device can be adapted to control the adjustment device such that the impact areas of the granular material dispensed by one or more spreading elements are located in the row areas of the agricultural land comprising plant rows. Alternatively or additionally, the control device can be adapted to control the adjustment device such that the impact areas of the granular material dispensed by one or more spreading elements are located in intermediate areas which run between adjacent plant rows. Thus, granular material can be spread in a targeted manner onto the row areas and/or the intermediate areas running between the row areas.

In a preferred embodiment of the agricultural distribution device according to the invention, the adjustment device comprises one or more positioning devices, by means of which the position of one or more spreading elements on the distribution linkage can be changed. Preferably, individual positioning of individual spreading elements can be implemented by means of several positioning devices. Preferably, all spreading elements can each be positioned independently of other spreading elements by means of a positioning device. Alternatively or additionally, a group positioning of several spreading elements can be effected, wherein a group of spreading elements can be positioned simultaneously within the scope of a group positioning. By means of the positioning devices, it is preferably possible to change the position of one or more spreading elements along the distribution linkage of the agricultural distribution device, thus, transversely to the direction of travel of the agricultural distribution device. Alternatively or additionally, the entire distribution linkage together with the spreading elements arranged on the distribution linkage can also be moved by means of a positioning device.

Moreover, an agricultural distribution device according to the invention is preferable in which the one or more positioning devices each have a displacement mechanism by means of which the one or more spreading elements can be displaced along the distribution linkage. In particular, the respective displacement mechanisms may comprise an adjustment rail which extends over a partial section of the distribution linkage transversely to the direction of travel of the agricultural distribution device. Preferably, one or more spreading elements are attached to the respective adjustment rails and are displaceable along the adjustment rails.

In another embodiment of the agricultural distribution device according to the invention, the control device is adapted to control the one or more positioning devices such that the one or more spreading elements are each positioned substantially vertically above a plant row during the spreading process. The positioning of individual or several spreading elements vertically above a plant row enables a row-related spreading of granular material to be carried out particularly precisely in order to achieve a particularly effective supply of granular material to the crop plants. Alternatively or additionally, the control device may be adapted to control the one or more positioning devices such that individual or multiple spreading elements are each positioned above and substantially centrally between two plant rows during the spreading process. Positioning individual or multiple spreading elements above and substantially centrally between two plant rows can implement precise spreading of granular material to the intermediate areas between the plant rows. Granular material, which is intended to enhance soil quality rather than support the crop plants, can be spread in these intermediate areas.

In addition, an agricultural distribution device according to the invention is preferable, in which the control device is adapted to control the adjustment device such that the average distance in the horizontal direction between the detected plant rows and the spreading elements respectively associated with the plant rows is minimal. In particular, if the one or more positioning devices do not allow exact positioning of all spreading elements above the plant rows, an acceptable row reference is still produced in this way. For example, the agricultural distribution device comprises several groups of spreading elements, wherein the individual groups of spreading elements can be displaced along the distribution linkage and thus transversely to the direction of travel of the agricultural distribution device. Since the relative position of individual spreading elements of a group of spreading elements cannot be changed, the exact positioning of all spreading elements above a plant row is often not possible. In this case, the individual groups of spreading elements are positioned such that the average distance in the horizontal direction between the detected plant rows and the spreading elements respectively associated with the plant rows is minimal. Preferably, the control device is adapted to calculate a corresponding position for the respective groups of spreading elements, taking into account the adjustment possibilities and the relative positioning of individual spreading elements of a group with respect to each other.

In a further embodiment of the agricultural distribution device according to the invention, the adjustment device comprises one or more pivoting devices, by means of which the inclination of one or more spreading elements on the distribution linkage can be changed. By means of the one or more pivoting devices, an inclination adjustment of individual spreading elements can be effected, for example, such that individual spreading elements are aligned with detected plant rows on the agricultural land. Alternatively or additionally, the inclination adjustment can also be such that spreading elements are aligned with intermediate areas between adjacent plant rows. Furthermore, the one or more pivoting devices may also be adapted to adjust the inclination of a group of spreading elements. For example, a group of multiple spreading elements is arranged on a support structure, wherein the respective pivoting devices are adapted to change the inclination of a support structure.

In addition, an agricultural distribution device according to the invention is preferable, in which the control device is adapted to control the one or more pivoting devices such that individual or multiple spreading elements are each substantially aligned with a plant row during the spreading process. Alternatively or additionally, the control device may be adapted to control the one or more pivoting devices such that individual or more spreading elements are each aligned with an area between two plant rows during the spreading process. The one or more pivoting devices may be provided in addition to, or as an alternative to, the one or more positioning devices.

Moreover, an agricultural distribution device according to the invention is preferred, in which the adjustment device comprises one or more rotating devices by means of which the direction of rotation of one or more spreading elements on the distribution linkage can be changed. Preferably, the one or more rotating devices are arranged to rotate one or more spreading elements about their own vertical axis. In particular, if spreading elements do not produce a fan-shaped distribution pattern but implement a directed material spread, the spread of the granular material can be adjusted by rotating the spreading elements about their vertical axis. For example, by rotating spreading elements around their own vertical axis, the spreading width in the impact area of the granular material can be changed.

In an alternative embodiment of the agricultural distribution device according to the invention, the latter has a plurality of support structures connected to the distribution linkage, wherein a plurality of spreading elements are attached to the support structures in each case and the position and/or inclination of the support structures can be changed by means of the adjustment device. If the spreading elements are configured as distribution nozzles, the carrier structures can be nozzle support units. Several spreading elements in the form of distribution nozzles are attached to or arranged on corresponding nozzle support units. The spreading elements can be movably or immovably attached to the respective support structures. If the spreading elements are attached immovably to the support structures, the relative position and/or the relative inclination of the spreading elements of a support structure with respect to each other cannot be changed. If the spreading elements are movably attached to the support structure, the relative position and/or the relative inclination of the spreading elements of a support structure to each other can be changed.

In addition, an agricultural distribution device according to the invention is preferred, in which the distribution pattern of one or more spreading elements can be changed by means of the adjustment device. For example, the adjustment device comprises different positions of a deflector-like guide device, wherein the different positions of the guide device result in the generation of different distribution patterns. For example, the adjustment device can also have spreading quantity control units, e.g. valves, by means of which the quantity of material provided to the spreading elements can be adjusted or controlled. Alternatively or additionally, the adjustment device can act on the shaping of spreading elements configured as baffle plates and/or guiding devices so that an adapted distribution pattern is generated by these spreading elements.

In addition, an agricultural distribution device according to the invention is preferable, in which the detection device comprises one or more sensors and/or one or more cameras for detecting plant rows. The one or more sensors and/or the one or more cameras are preferably arranged and/or attached to the distribution linkage of the agricultural distribution device. In particular, the control device comprises an evaluation unit which detects the presence, the position and/or the course of plant rows based on the signals from the one or more sensors and/or the signals from the one or more cameras.

The problem underlying the invention is furthermore solved by a method of the type mentioned introductorily, wherein within the scope of the method according to the invention the adjustment device is controlled during the spreading process as a function of the plant rows on the agricultural land detected by the detection device. The granular material may be granular or powdered plant or soil nutrient and/or pest control agent, such as slug pellets, or may comprise plant or soil nutrient and/or pest control agent. Preferably, the method of spreading granular material according to the invention is carried out using an agricultural distribution device according to any of the embodiments described above.

In a preferred embodiment of the method according to the invention, changing the impact area of the granular material dispensed by one or more spreading elements onto the agricultural land during the spreading process comprises changing the position of one or more spreading elements on the distribution linkage and/or changing the inclination of one or more spreading elements on the distribution linkage. Alternatively or additionally, changing the impact area of the granular material dispensed by one or more spreading elements onto the agricultural land during the spreading process comprises changing the direction of rotation of one or more spreading elements on the distribution linkage and/or changing the distribution pattern of one or more spreading elements. Changing the position may comprise displacing one or more spreading elements, in particular along the distribution linkage and/or transversely to the direction of travel of the agricultural distribution device.

In the following, preferred embodiments of the invention are explained and described in more detail with reference to the accompanying drawings. Therein:

FIG. 1 shows a distribution linkage of an agricultural distribution device according to the invention in a schematic view;

shows a distribution linkage of another agricultural distribution device according to the invention in a schematic view; and FIG. 1 shows a distribution linkage of a further agricultural distribution device according to the invention in a schematic view.

FIG. 1 shows a distribution linkage 12 of an agricultural distribution device 10, wherein the agricultural distribution device 10 is configured as a pneumatic spreader. The distribution linkage 12 comprises a plurality of linkage segments which can be pivoted relative to one another and which allow the distribution linkage 12 to be folded together. The illustrated section of the distribution linkage 12 shows a left-hand linkage half, wherein the distribution linkage 12 also comprises a right-hand linkage half.

A plurality of spreading elements 14a-14k are arranged on the distribution linkage 12, wherein the spreading elements 14a-14k are configured as distribution nozzles. The spreading elements 14a-14k serve to spread the granular material onto the agricultural land 24.

Furthermore, the agricultural distribution device 10 comprises a detection device 16 which serves to detect plant rows 26a-26k on the agricultural land 24. The detection device 16 comprises a plurality of cameras 18a-18j attached to the distribution linkage 12.

Moreover, the agricultural distribution device 10 comprises an adjustment device 20 by means of which the impact area AB of the granular material dispensed by the spreading elements 14a-14k on the agricultural land 24 can be varied during the spreading process.

The spreading elements 14a-14k, the cameras 18a-18j of the detection device 16, and the adjustment device 20 are connected to a control device which controls the adjustment device 20 as a function of the plant rows 26a-26k on the agricultural land 24 detected by the detection device 16 during the spreading process.

The adjustment device 20 comprises several positioning devices 22a-22d, by means of which the position of the spreading elements 14a-14k on the distribution linkage 12 can be changed. The positioning devices 20a-20d each comprise a displacement mechanism by means of which a plurality of spreading elements 14a-14k can be displaced along the distribution linkage 12 and thus transversely to the direction of travel of the agricultural distribution device 10. The displacement mechanism of the respective positioning devices 22a-22d permits individual positioning of the respective spreading elements 14a-14k. The spreading elements 14a-14k can be moved independently of one another in the shown adjustment directions 28a-28k. For moving the spreading elements 14a-14k, the positioning devices 22a-22d comprise corresponding actuators. The actuators can be electric, pneumatic or hydraulic actuators. The spreading elements 14a-14k are supplied with granular material via feed lines that are not shown, wherein the feed lines are configured to be variable in length in order to permit displacement of the spreading elements 14a-14k. For this purpose, the feed lines can be configured to be flexible, telescopic and/or otherwise variable in length, for example by providing a compensating feed line element.

By means of the control device, the positioning devices 22a-22d can be controlled such that the spreading elements 14a-14k are each positioned substantially vertically above a plant row 26a-26k during the spreading process. This allows precise row-related spreading of the granular material onto the agricultural land 24.

Alternatively or additionally to the illustrated control of the positioning devices 22a-22d, this may also be controlled such that the spreading elements 14a-14k are each positioned above and substantially centrally between two plant rows 26a-26k during the spreading process.

Furthermore, by means of the adjustment device, the distribution pattern of the spreading elements 14a-14k can also be adjusted. For this purpose, the adjustment device 20 can comprise adjustable or exchangeable nozzle attachments which can be adjusted as a function of the position or the course of the detected plant rows 26a-26k on the respective spreading elements 14a-14k. Alternatively or additionally, shape-changing baffle plates can be used as spreading elements 14a-14k. Furthermore, it is conceivable that spreading elements 14a-14k configured as centrifugal plates are used, the distribution pattern of which can be influenced, for example, via the rotational speed and/or the feed point of the granular material onto the centrifugal plate.

Figure 2:
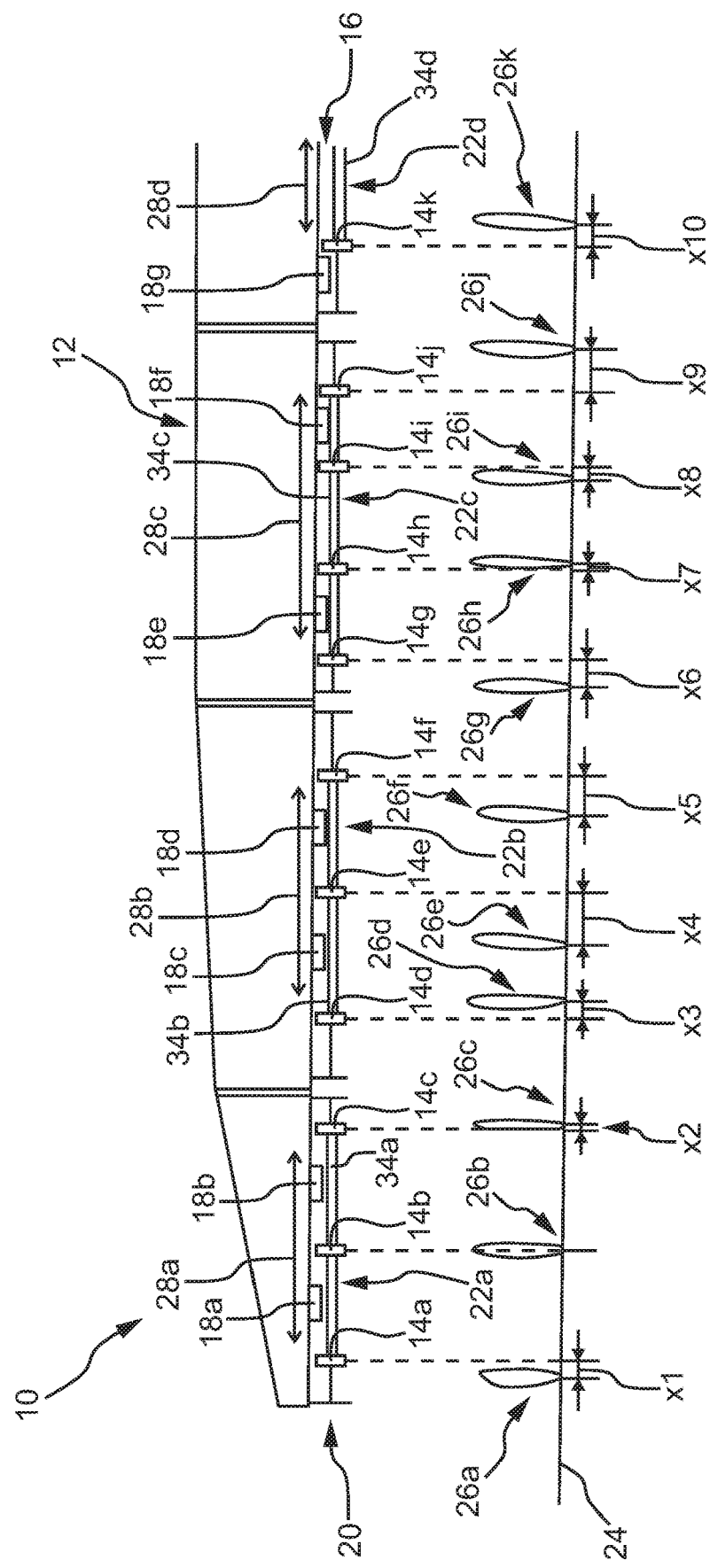

FIG. 2 also shows a distribution linkage 12 of an agricultural distribution device 10 configured as a pneumatic spreader. Unlike the adjustment device 20 of the distribution device 10 shown in FIG. 1, a plurality of spreading elements 14a-14k are each attached to a support structure 34a-34d, wherein the position of the support structures 34a-34d can be changed by means of the adjustment device 20. Specifically, the support structures 34a-34d can be displaced in the adjustment directions 28a-28d transversely to the direction of travel. The movement of the support structures 34a-34d is implemented by means of corresponding actuators of the agricultural distribution device 10.

The spreading elements 14a-14k are configured as distribution nozzles. The support structures 34a-34d are configured as nozzle support units. The spreading elements 14a-14k, which are each attached to a support structure 34a-34d, comprise an unchangeable relative position to each other. Since the spreading elements 14a-14k are attached immovably to the respective support structures 34a-34d, no exact positioning of the spreading elements 14a-14k above the plant rows 26a-26k is possible despite the displaceability of the support structures 34a-34d in the transverse direction. In order to ensure that the granular material is nevertheless spread with an acceptable row reference, the control device is adapted to control the adjustment device 20 such that the average distance in the horizontal direction between the detected plant rows 26a-26k and the spreading elements 14a-14k respectively associated with the plant rows 26a-26k is minimal. Thus, the sum of distances x1-x10 between the detected plant rows 26a-26k and the spreading elements 14a-14k respectively associated with the plant rows 26a-26k is also minimized.

Figure 3:
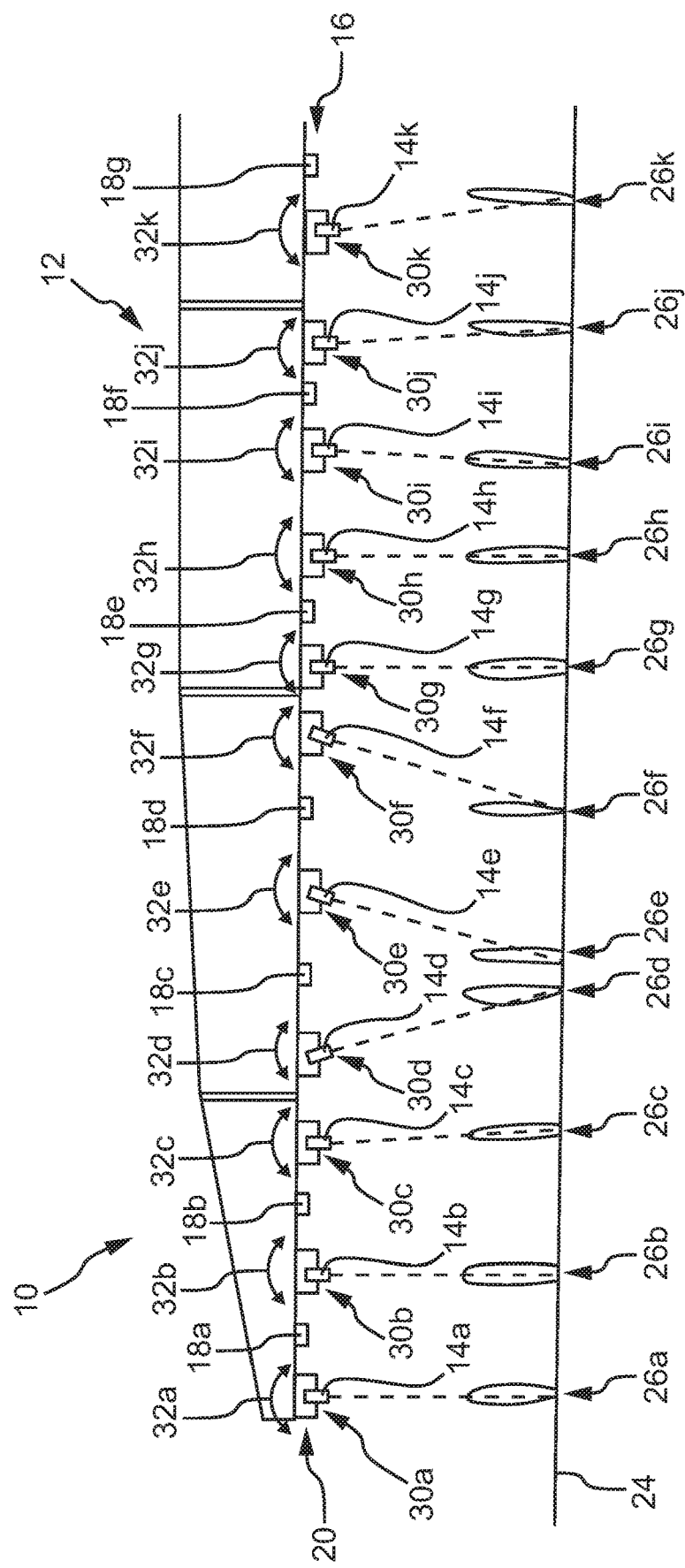

FIG. 3 also shows a section of a distribution linkage 12 of an agricultural distribution device 10. The adjustment device 20 of the agricultural distribution device 10 shown comprises a plurality of pivoting devices 30a-30k, by means of which the inclination of the spreading elements 14a-14k on the distribution linkage 12 can be changed in each case. By means of the pivoting devices 30a-30k, the inclination of the individual spreading elements 14a-14k can be adjusted independently of one another. The respective pivoting devices 30a-30k comprise actuators by means of which the spreading elements 14a-14k can be pivoted along the pivoting directions 32a-32k.

In the embodiment shown, the control device of the agricultural distribution device 10 is adapted to control the pivoting devices 30a-30k such that the spreading elements 14a-14k are each substantially aligned with one plant row 26a-26k during the spreading process so that granular material distributed by them impacts in the area of the plant rows 26a-26k.

Alternatively or additionally, however, the control device may be adapted to control the pivoting devices 30a-30k such that the spreading elements 14a-14k are each aligned with an area between two plant rows 26a-26k during the spreading process.

The adjustment options shown in FIG. 1 to FIG. 3 for adjusting the impact area AB of the granular material dispensed by the spreading elements 14a-14k can also be combined with each other. Thus, in addition to positioning devices 22a-22d for longitudinal displacement of the spreading elements 14a-14k in the transverse direction, an adjustment device 20 can simultaneously also have pivoting devices 30a-30k by means of which the inclination of the spreading elements 14a-14k can be changed during the spreading process.

REFERENCE SIGNS 10 agricultural distribution device
12 distribution linkage
14a-14k spreading elements
16 detection device
18a-18j cameras
20 adjustment device
22a-22d positioning devices
24 agricultural land
26a-26k plant rows
28a-28k adjustment directions
30a-30k pivoting device
32a-32k pivoting directions
34a-34d support structure
AB impact areas
x1-x10 distances

The invention claimed is:

1. An agricultural distribution device, comprising:
a plurality of spreading elements disposed on a distribution linkage and configured to spread granular material onto an agricultural land, each spreading element of the plurality of spreading elements including a telescopic feed line;
at least one camera configured to detect plant rows on the agricultural land;
a plurality of adjustment devices configured to change an impact area of the granular material dispensed by one or more of the spreading elements on the agricultural land during a spreading process; and
a processor configured to control the plurality of adjustment devices as a function of the plant rows on the agricultural land, detected by the at least one camera, during the spreading process,
wherein the agricultural distribution device further comprises a plurality of support structures connected to the distribution linkage, wherein a plurality of the plurality of spreading elements is attached to each support structure of the plurality of support structures, and each position of each support structure of the plurality of support structures is independently changeable by one adjustment device of the plurality of adjustment devices,
wherein the plurality of spreading elements are movably attached to the respective support structures, and wherein each telescopic feed line is telescopically variable in length, to permit displacement of each spreading element of the plurality of spreading elements,
wherein each camera of the at least one camera is associated with one support structure of the plurality of support structures, and
wherein each position of each support structure of the plurality of support structures is independently changeable based on the detection of plant rows by one associated camera of the at least one camera, the one associated camera being configured to detect plant rows on the agricultural land below the one support structure.

2. The agricultural distribution device according to claim 1, wherein the plurality of adjustment devices comprises one or more positioning devices for changing a position of the one or more of the spreading elements on the distribution linkage.

3. The agricultural distribution device according to claim 2, wherein the one or more positioning devices each comprise a displacement mechanism for displacing the one or more of the spreading elements along the distribution linkage.

4. The agricultural distribution device according to claim 2, wherein the processor is configured to control the one or more positioning devices such that the one or more of the spreading elements are each positioned substantially vertically above one of the plant rows during the spreading process.

5. The agricultural distribution device according to claim 1, wherein the processor is configured to control the adjustment device such that an average distance in a horizontal direction between the detected plant rows and the spreading elements respectively associated with the plant rows is minimal.

6. The agricultural distribution device according to claim 1, wherein the adjustment device comprises one or more pivoting devices for changing an inclination of the one or more of the spreading elements on the distribution linkage.

7. The agricultural distribution device according to claim 6, wherein the processor is to control the one or more pivoting devices such that the one or more of the spreading elements are each substantially aligned with one of the plant rows during the spreading process.

8. The agricultural distribution device according to claim 1, wherein the adjustment device comprises one or more rotating devices for changing a direction of rotation of the one or more of the spreading elements on the distribution linkage.

9. The agricultural distribution device according to claim 1, wherein the adjustment device is configured to change a distribution pattern of the one or more of the spreading elements.

10. A method of spreading granular material on an agricultural land with an agricultural distribution device, comprising the steps of:
spreading the granular material onto the agricultural land by a plurality of spreading elements arranged on one of a plurality of support structures, the plurality of support structures being connected to a distribution linkage and each position of each support structure of the plurality of support structures is independently changeable by an adjustment device of a plurality of adjustment devices, each spreading element of the plurality of spreading elements including a telescopic feed line, each telescopic feed line being telescopically variable in length, to permit displacement of each spreading element of the plurality of spreading elements;

detecting plant rows on the agricultural land by at least one camera, each camera of the at least one camera being associated with one support structure of the plurality of support structures;

changing an impact area of the granular material dispensed by one or more of the spreading elements onto the agricultural land during a spreading process by the plurality of adjustment devices;

controlling the adjustment device as a function of the plant rows, detected by the at least one camera-on the agricultural land, during the spreading process; and changing the relative position of the spreading elements of each support structure of the plurality of support structures independently from each of the other support structures based on the detection of plant rows by at least one associated camera of the at least one camera, the one associated camera being configured to detect plant rows on the agricultural land below the one support structure.

11. The method according to claim 10, wherein changing the impact area of the granular material dispensed by the one or more of the spreading elements onto the agricultural land during the spreading process comprises at least one of the following steps:

changing a position of the one or more of the spreading elements on the distribution linkage;

changing an inclination of the one or more of the spreading elements on the distribution linkage;

changing a rotational orientation of the one or more spreading elements on the distribution linkage; or changing a distribution pattern of the one or more of the spreading elements.

12. An agricultural distribution device, comprising:

a plurality of spreading elements disposed on a distribution linkage and configured to spread granular material onto an agricultural land, each spreading element of the plurality of spreading elements including a telescopic feed line, each telescopic feed line is telescopically variable in length, to permit displacement of each spreading element of the plurality of spreading elements;

at least one camera, the at least one camera being configured to detect plant rows on the agricultural land;

a plurality of adjustment devices configured to change an impact area of the granular material dispensed by one or more of the spreading elements on the agricultural land during a spreading process; and a processor configured to control the adjustment the plurality of adjustment devices as a function of the plant rows on the agricultural land, detected by the camera, during the spreading process, wherein the processor is configured to measure, using the at least one camera, the distance between the detected plant rows on the agricultural land for each spreading element of the spreading elements respectively associated with each detected plant row of the plant rows, wherein the processor is configured to calculate an average distance in the horizontal direction between the detected plant rows on the agricultural land and each of the spreading elements respectively associated with each plant row of the plant rows, wherein the processor is configured to control the adjustment device such that the average distance in a horizontal direction between the detected plant rows and the spreading elements respectively associated with the plant rows is minimal, and wherein the processor is adapted to calculate a corresponding position for the spreading elements, taking into account the adjustment possibilities and relative positioning of individual spreading elements with respect to each other.

* * * * *